United States Patent
Krohn et al.

(10) Patent No.: US 8,611,567 B2
(45) Date of Patent: Dec. 17, 2013

(54) DIRECT WRITING OF FUNCTIONALIZED ACOUSTIC BACKING

(75) Inventors: Matthew Harvey Krohn, Reedsville, PA (US); Prabhjot Singh, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/267,610

(22) Filed: Oct. 6, 2011

(65) Prior Publication Data

US 2013/0088122 A1  Apr. 11, 2013

(51) Int. Cl.
*H04R 25/00* (2006.01)
*H04R 31/00* (2006.01)

(52) U.S. Cl.
USPC .............................................. 381/190; 29/594

(58) Field of Classification Search
USPC .......................... 310/311, 321, 322, 328, 334
See application file for complete search history.

(56) References Cited

U.S. PATENT DOCUMENTS

| | | | | |
|---|---|---|---|---|
| 5,511,296 | A | * | 4/1996 | Dias et al. .................... 29/25.35 |
| 5,592,730 | A | | 1/1997 | Greenstein et al. |
| 5,648,942 | A | | 7/1997 | Kunkel, III |
| 5,744,898 | A | * | 4/1998 | Smith et al. ................... 310/334 |

* cited by examiner

*Primary Examiner* — Brian Ensey
*Assistant Examiner* — Norman Yu
(74) *Attorney, Agent, or Firm* — Hiscock & Barclay LLP

(57) ABSTRACT

An acoustic transducer and method of making the acoustic transducer is disclosed. A transducer element for converting a signal between one of an electrical signal and an acoustic signal and the other of the electrical signal and the acoustic signal is provided. A backing to the transducer is additively fabricated to a side of the transducer element. The backing includes an electrically conductive path therein for conducting the electrical signal.

20 Claims, 4 Drawing Sheets

DIRECT WRITING OF FUNCTIONALIZED
ACOUSTIC BACKING

BACKGROUND OF THE INVENTION

The subject matter disclosed herein relates generally to methods of fabricating acoustic transducers using direct writing methods. Acoustic transducers generally include a transducer element, which is often a piezoelectric element coupled to one or more electrical connections for electrical signal transmission, and an acoustic backing for attenuating acoustic signals. Typically, acoustic transducers are fabricated by applying the acoustic backing and various electrical connections to the transducer element through various bonding methods. Acoustic transducers constructed using current methods typically encounter unmatched acoustic qualities between the transducer element and the acoustic backing. Also such transducers require routing electrical connections to the side of the transducer. The present invention provides a method of using additive fabricating methods to fabricate acoustic transducers without the above constraints of prior art transducers.

BRIEF DESCRIPTION OF THE INVENTION

According to one aspect of the invention, a method of making an acoustic transducer is provided which includes the steps of providing a transducer element for converting between one of an electrical signal and an acoustic signal and the other of the electrical signal and the acoustic signal, and additively fabricating a backing to the transducer element to having an electrically conductive path therein for conducting the electrical signal.

According to another aspect of the invention, an acoustic transducer is provided that includes a transducer element configured to convert a signal between one of an electrical signal and an acoustic signal and the other of the electrical signal and the acoustic signal and an additively fabricated backing having an electrically conductive path formed therein configured to conduct the electrical signal.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
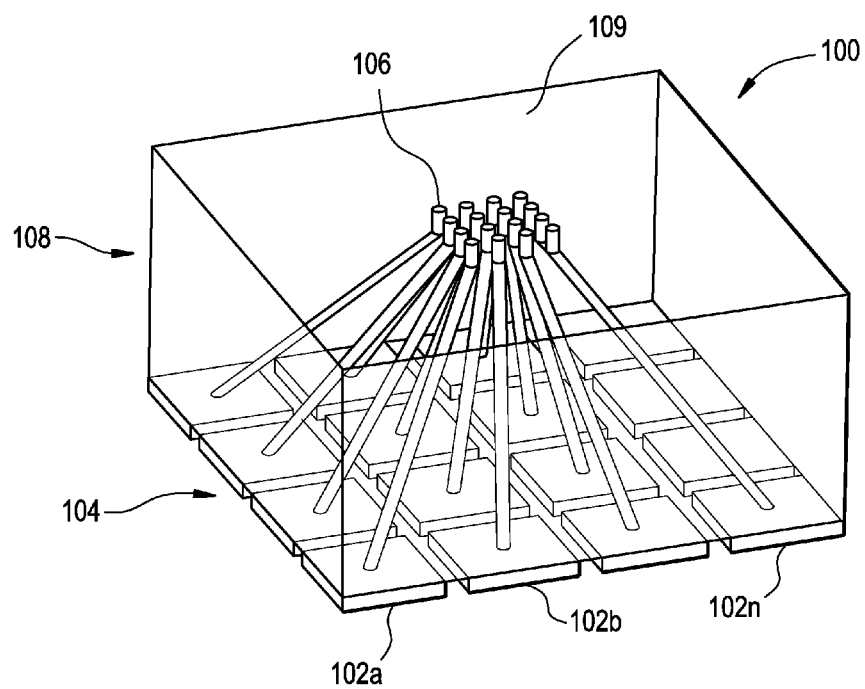
FIG. 1 is a view of an exemplary acoustic transducer of the present disclosure assembled using an exemplary fabrication method of the present disclosure.

FIG. 1 shows an exemplary acoustic transducer 100 assembled using an exemplary method of the present disclosure. The exemplary acoustic transducer 100 includes a transducer layer 104 and an acoustic backing 108 coupled to the transducer layer 104. The transducer layer 104 includes one or more transducer elements 102a, 102b, ..., 102n, which can be piezoelectric elements. The transducer elements 102a, 102b, ..., 102n, are configured to receive an acoustic signal, which can include acoustic or ultrasonic signals, and generate an electrical signal in response to the received acoustic signal. Acoustic backing 108 includes backing material 109 configured to provide acoustic signal attenuation and one or more electrically conductive paths, such as exemplary path 106, for conducting the electrical signal generated at the transducer layer 104 to circuitry (not shown) for processing. In one embodiment, the one or more electrically conductive paths traverse an interior region of the backing 108. The acoustic backing 108 and the one or more electrically conducting paths 106 are formed using the exemplary methods disclosed herein. In another aspect, the transducers are configured to transmit an acoustic signal. An electrical signal is sent along one or more conducting paths 106 through the acoustic backing 108 to the transducer elements 102a, 102b, ..., 102n. The transducer elements then convert the electrical signal to an acoustic signal for transmission.

Figure 2:
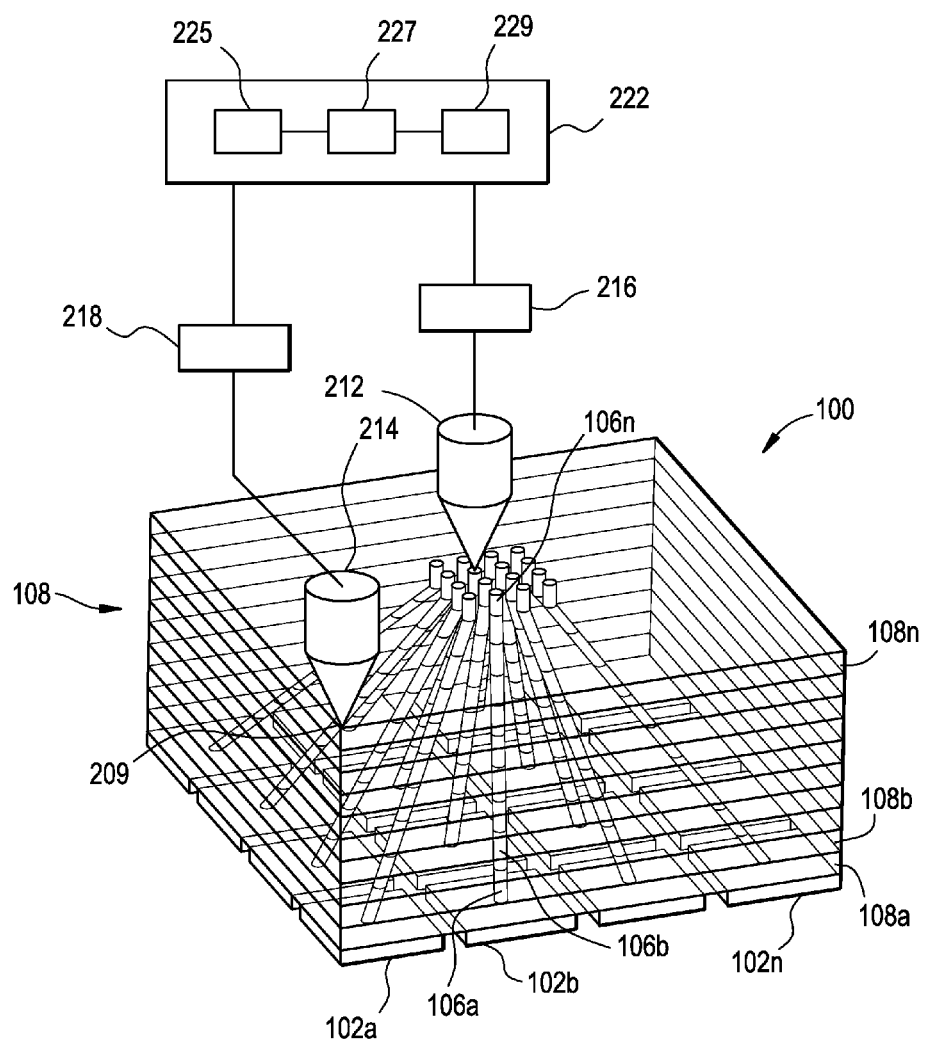
FIG. 2 is a detailed view of the exemplary acoustic transducer of FIG. 1 illustrating an exemplary fabrication method of the present disclosure.

FIG. 2 shows a detailed view of the exemplary acoustic transducer 100 of FIG. 1 illustrating an exemplary fabrication method of the present disclosure. In one aspect, the exemplary fabrication method can include a process of additive fabrication in which materials are deposited, usually layer upon layer, to make three-dimensional objects. Various exemplary methods of additive fabricating usable with the present disclosure include: direct writing; electron beam deposition; laser deposition, and stereo-lithography, among others. As an exemplary method of additive fabrication, direct writing includes direct write heads or nozzles that are movable in three directions to deposit a colloidal gel, a highly-filled suspension or a slurry at various locations. The slurry is typically selected to have a high viscosity when exiting the nozzle tip. The slurry generally retains the cross-sectional area of the nozzle tip. The slurry changes phase to solid upon deposition due to heat transfer, UV light, chemical reaction, for example. Typically the slurry substantially retains the cross-section shape of the of the nozzle tip. Therefore, the nozzle can deposit the slurry at a location without substantial diffusion. The slurry can be deposited to substantially form a ball at a selected location. Alternatively, the nozzle tip can be moved while the slurry is deposited to thereby deposit the slurry in a line or other one- or two-dimensional shape within the layer. Typically, these features (i.e., ball, line, etc.) are between about 5 microns to about 50 microns across. The solidified slurry thereby can be deposited to form a first layer. A second layer of slurry can be deposited on the first layer on or before solidification of the slurry within the first layer. By repeating this process, multiple layers can be deposited. Additionally, multiple slurry can be deposited within a selected layer, including an electrically conductive slurry which can be used to conduct and electrical signal of a transducer element. By controlling the location at which slurry is deposited, one can build a three-dimensional object layer by layer.

Referring back to FIG. 2, exemplary acoustic transducer includes an acoustic backing 108 having a plurality of layers 108a, 108b, ..., 108n which form the acoustic backing 108. The lower side of backing layer 108a, which faces the transducer elements 102a, 102b, ..., 102n, may be referred to herein as the backing bottom side, or the bottom side of the backing, while the upper side of backing layer 108n, which faces away from the backing layers below it, may be referred to herein as the backing top side, or the top side of the backing. Moreover, the transducer elements 102a, 102b, ..., 102n, have an upper side facing the backing bottom side, which upper side may be referred to herein as the transducer top side, while the lower side of the transducer elements 102a, 102b, ..., 102n, which face away from the backing bottom side may be referred to herein as the transducer bottom side. A typical layer can be between 5 microns and 50 microns in height. Electrically conductive path 106 includes a plurality of electrically conductive materials 106a, 106b, ..., 106n which are deposited in layers 108a, 108b, ..., 108n to form electrically conductive path 106 of FIG. 1. In various embodiments, electrically conductive material 106a is deposited in backing layer 108a in a direction that is non-orthogonal to the backing bottom side, electrically conductive material 106b is deposited in backing layer 108b in a direction that is also non-orthogonal to the backing bottom side, and so forth. The electrically conductive material at the backing bottom side may be referred to herein as a bottom terminus (singular) or termini (plural) of the electrically conductive material while the electrically conductive material at the backing top side may be referred to herein as a top terminus or termini of the electrically conductive material. A first deposition nozzle 212 deposits the electrically conductive material and a second deposition nozzle 214 deposits backing material to form the layers. In an exemplary embodiment, the first and second nozzles 212, 214 are coupled to motion devices 216, 218 configured to move the nozzle tips in three dimensions to selected locations. The motion devices 216, 218 are coupled to a control unit 222 configured to control the motion devices 216, 218 and thereby the location of the nozzle tips 212, 214 as well as to control deposition of the slurry. The control unit 222 includes a memory 225, a set of programs 229 storing instructions therein for fabricating the acoustic transducer according to the additive fabrication processes described herein, and a processor 227 having access to the set of programs 229 and to the contents of the database 225. The processor 227 is configured to run the various programs to move the nozzle tips to the locations as determined by the various programs and data in the database. The programs can include instructions for constructing electrically conductive paths in various shapes and forms. In the exemplary embodiment of FIG. 2, the electrically conductive paths are provided through the backing and form a three-dimensional pattern.

Various methods for constructing the acoustic backing and/or electrically conducting paths are now discussed. In one embodiment, the backing 108 is assembled by additive fabrication layer by layer. First layer 108a is constructed by depositing backing material 209 from nozzle 214 in the first layer 108a and/or electrically conductive material 106b from nozzle 212 using for example a direct writing method. Electrically conductive material 106a is typically also deposited in the first layer. Second layer 108b is fabricated on top of the first layer 108a by deposited backing material 209 from nozzle 214 and/or electrically conductive material 106b from nozzle 212. Each successive layer is thus constructed until the backing is completed. In various aspects, the electrically conductive materials of the first and second layers or any adjoining layers are deposited so as to electrically couple together thereby forming an electrical path that can be used as an electrical connection to the transducer element. The electrically conductive material of an upper layer can be deposited directly on top of the electrically conductive material of a lower layer or can be offset from the electrically conductive material of the lower layer. Offset can be used to form an electrically connection having two and three dimensions. In addition, the electrically conductive material of each layer can be of any shape or form within the layer, including for example a dot, a line, a circle, a spiral, an ellipse, a polygon, etc.

Figure 3:
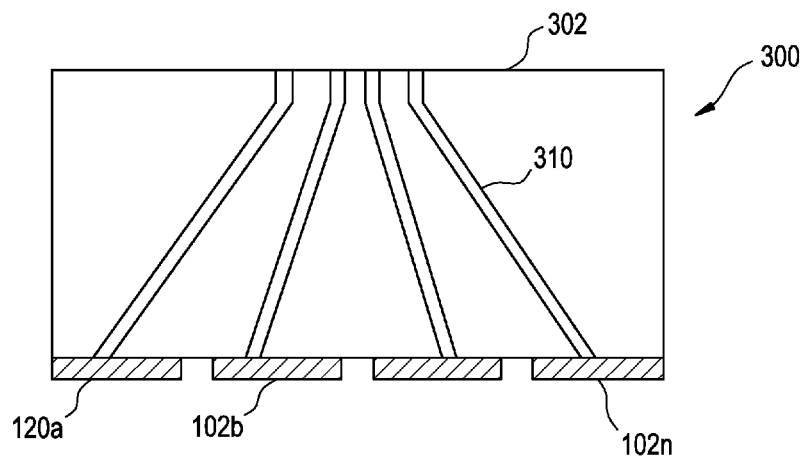
FIGS. 3 and 3A illustrate an alternate method of fabricating an exemplary acoustic transducer of the present disclosure.
Figure 3A:
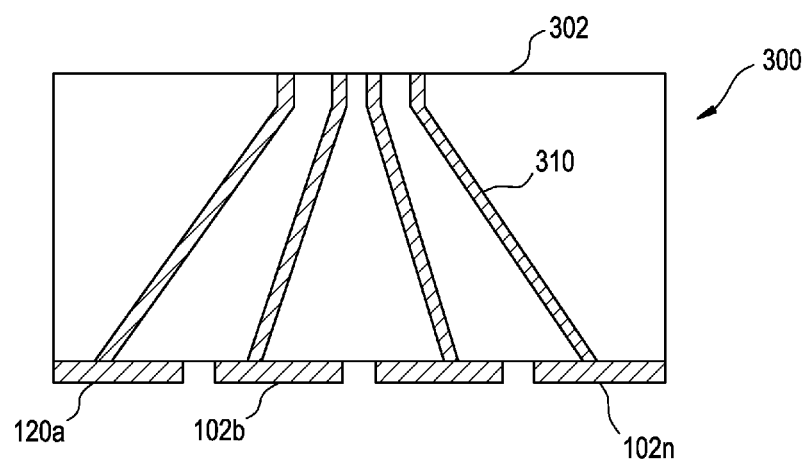

FIG. 3 shows an exemplary acoustic transducer assembled using an alternate additive fabrication method. Backing 300 is fabricated by depositing backing material 302 to form channels 310. Once the backing have been formed, the channels 310 are filled with an electrically conductive material such as conductive epoxy 312, as shown in FIG. 3A.

Figure 4:
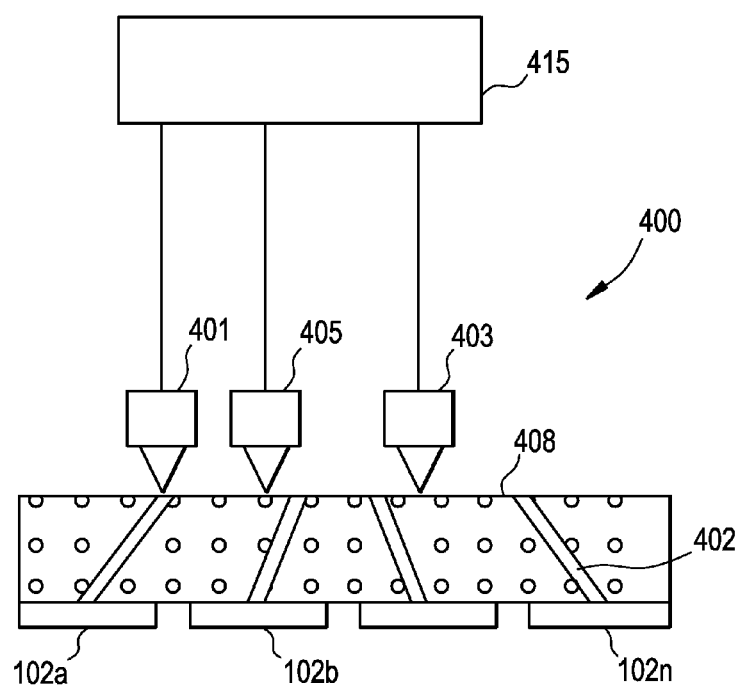
FIG. 4 shows an acoustic transducer having an acoustic backing assembled with gaps therein according to an alternate fabrication method of the present invention.

FIG. 4 shows an acoustic transducer having a backing 400 assembled with gaps therein according to an alternate additive fabrication method of the present disclosure. Nozzles 401, 403 and 405 deposit various materials to form the backing 400. The nozzles can be controlled using a control unit 415. First nozzle 401 can be controlled to deposit electrically conductive material, which can be a conductive epoxy, to form electrical connections 402. Second nozzle 403 can be controlled to deposit backing material in layers. In one aspect, control unit 415 controls second nozzle 403 to leave gaps 408 in a particular backing layer at selected locations. The control unit 415 can the control third nozzle 405 to deposit damping material or scattering material in all or some of the gaps 408 left by the second nozzle. In the various embodiments herein, the backing material and/or the damping/scattering material can be selected to have properties that match acoustic properties of various elements of the transducer layer. The gaps can be created to have various sizes and shapes. Gap location can be selected either randomly or based on a suitable model.

In one aspect, the backing layers and electrical connections therein can be assembled by performing the exemplary additive fabricating methods disclosed herein directly on the transducer element. In another aspect, the backing layers can be assembled and the assembled backing layers can be deposited in layers on the transducer element to form the acoustic backing.

The electrically conductive path can be selected to reduce generation of an acoustic signal at an interface of the transducer layer and the backing containing the electrically conductive path. The electrically conductive path can be shaped to channel an acoustic wave in the backing layer. Alternatively, the electrically conductive path can be formed to enhance an electrical signal generated at the transducer layer. The electrically conductive path can take an electric signal from the surface of transducer elements, through the bulk of the backing to the surface of the backing opposite the transducer elements. The electrical material can be polymetic materials filled with a high volume concentration of metal particles The exemplary fabrication methods disclosed herein can be used to assemble electrical connections passing through an interior region of the acoustic backing. Electrical connections in the acoustic backing can reduce acoustic signal generation at the interface of the transducer layer and the acoustic backing. In addition, the composition of the backing can be controlled and selected according to design considerations. Electrical connections can be designed to channel various acoustic signals.

Therefore, in one aspect, the present disclosure provides a method of making an acoustic transducer, including the steps of additively fabricating a backing to a transducer element of the acoustic transducer to have an electrically conductive path therein for conducting an electrical signal of the transducer element. In one embodiment, the backing includes a plurality of backing layers and additively fabricating the backing includes depositing a first layer of the backing and depositing a second layer of the backing on the first layer. Depositing one of the first and second backing layers can include depositing a slurry in the one of the first and second backing layer and allowing the slurry to solidify. The method can further include depositing an electrically conductive material in at least one of the plurality of backing layers to provide the electrically conductive path. The electrically conductive material in a layer of the plurality of layers is in the shape of at least one of: (i) a dot; (ii) a line; (iii) a circle; (iv) a polygon; and (v) a spiral. The backing can be additively fabricated to have at least one channel and which can be filled with a conductive material to provide the electrically conductive path. A backing layer of the backing can be fabricated to have one or more gaps in the backing layer. The one or ore gaps can be filled with at least one of: (i) an acoustic damping material, and (ii) an acoustic scattering material deposited therein. The backing can be additively fabricated to reduce generation of an acoustic signal at an interface of the transducer layer and the backing layer, channel an acoustic wave in the backing layer, or enhance an electrical signal generated at the transducer layer in various aspects. Exemplary methods of additive fabricating include directly writing, electron beam deposition, laser deposition, and stereo-lithography, for example.

In another aspect, the present disclosure provides an acoustic transducer that includes a transducer element configured to convert a signal between one of an electrical signal and an acoustic signal and the other of the electrical signal and the acoustic signal; and an additively fabricated backing having an electrically conductive path therein configured to conduct the electrical signal. The backing can include a plurality of backing layers and be additively fabricated by depositing a first layer of the backing and depositing a second layer of the backing on the first layer. In one embodiment, at least one of the plurality of layers of the backing includes a slurry deposited in the at least one of the plurality of layers. At least one of the plurality of layers can include an electrically conductive material deposited in at least one of the plurality of backing layers to provide the electrically conductive path. The electrically conductive material in a layer of the plurality of layers can be in the shape of at least one of: (i) a dot; (ii) a line; (iii) a circle; (iv) a polygon; and (v) a spiral. The backing can be additively fabricated to have at least one channel and the at least one channel is filled with a conductive material to provide the electrically conductive path. At least one backing layer can be formed to include one or more gaps, which gaps can be filled with at least one of: (i) an acoustic damping material, and (ii) an acoustic scattering material deposited in the one or more gaps. The additively fabricated backing can be configured to do at least one of: (i) reduce generation of an acoustic signal at an interface of the transducer layer and the backing layer; (ii) channel an acoustic wave in the backing layer; and (iii) enhance an electrical signal generated at the transducer layer. Additive fabricating processes include direct writing, electron beam deposition, laser deposition and stereo-lithography, for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An acoustic transducer, comprising:
   a transducer element configured to convert an electrical signal into an acoustic signal or convert an acoustic signal into an electrical signal, the transducer element having a transducer element bottom side for receiving the acoustic signal and a transducer element top side opposite the transducer element bottom side; and
   a backing comprising a backing bottom side attached to the transducer element top side, the backing further comprising a backing top side opposite the backing bottom side, the backing having an electrically conductive path therein electrically connected to the transducer element top side and configured to conduct the electrical signal, the electrically conductive path extending in a substantially straight line from the backing bottom side toward the backing top side in a non-orthogonal direction relative to the backing bottom side.

2. The acoustic transducer of claim 1, wherein the backing includes a plurality of layers and the backing is additively fabricated by depositing a first layer of the backing and depositing a second layer of the backing on the first layer.

3. The acoustic transducer of claim 2, wherein at least one of the plurality of layers of the backing includes a slurry deposited in the at least one of the plurality of layers.

4. The acoustic transducer of claim 2, wherein at least one of the plurality of layers includes an electrically conductive material deposited therein to provide the electrically conductive path.

5. The acoustic transducer of claim 4, wherein the electrically conductive material in a layer of the plurality of layers is in the shape of at least one of: (i) a dot; (ii) a line; (iii) a circle; (iv) a polygon; and (v) a spiral.

6. The acoustic transducer of claim 1, wherein the backing is additively fabricated to have at least one channel and the at least one channel is filled with a conductive material to provide the electrically conductive path.

7. The acoustic transducer of claim 1 wherein at least one layer of the backing includes one or more gaps.

8. The acoustic transducer of claim 7 wherein the at least one layer includes at least one of: (i) an acoustic damping material, and (ii) an acoustic scattering material deposited in the one or more gaps.

9. The acoustic transducer of claim 1, wherein the additively fabricated backing is configured to do at least one of: (i) reduce generation of an acoustic signal at an interface of the transducer layer and the backing layer; (ii) channel an acoustic wave in the backing layer; and (iii) enhance an electrical signal generated at the transducer layer.

10. The acoustic transducer of claim 1, wherein the backing is formed by an additive fabricating process that comprises at least one of: (i) direct writing; (ii) electron beam deposition; (iii) laser deposition; and (iv) stereo-lithography.

11. An acoustic transducer comprising:
   a plurality of transducer elements disposed substantially in a first plane, each of the transducer elements having a bottom side for receiving acoustic signals impacting thereon and a top side opposite the bottom side; and
   a backing comprising a plurality of substantially planar layers each made primarily of a non-conductive backing material, a first layer of the backing adjacent to the top sides of the plurality of transducer elements such that a bottom side of the first layer is adjacent the top sides of the plurality of transducer elements, the first layer comprising a plurality of first conductive signal lines extending through the first layer from its bottom side to its top side, each of the signal lines in electrical contact with one of the transducer elements.

12. The transducer of claim 11, wherein the backing further comprises a second layer adjacent to the top side of the first layer such that a bottom side of the second layer is adjacent the top side of the first layer, the second layer comprising a plurality of second conductive signal lines extending through the second layer from its bottom side to its top side, each of the second conductive signal lines in electrical contact with one of the first conductive signal lines.

13. The transducer of claim 12, wherein the backing further comprises a third layer adjacent to the top side of the second layer such that a bottom side of the third layer is adjacent the top side of the second layer, the third layer comprising a plurality of third conductive signal lines extending through the third layer from its bottom side to its top side, each of the third conductive signal lines in electrical contact with one of the second conductive signal lines.

14. The transducer of claim 12, wherein the first and second conductive signal lines extend in a substantially straight line through their corresponding backing layer in a direction that is non-orthogonal relative to the top and bottom side of their corresponding backing layer.

15. The transducer of claim 12, wherein each of the first conductive signal lines and a corresponding second conductive signal line with which it is in electrical contact together form a unitary conductive line, and wherein all the unitary conductive signal lines extend through their corresponding backing layers in a converging direction.

16. An acoustic transducer comprising:
a backing portion comprising a bottom side and a top side, the backing portion comprising a nonconductive material having a plurality of conductive lines disposed therewithin, the conductive lines each comprising a bottom terminus at the bottom side of the backing portion and extending at a non-orthogonal angle relative to the bottom side to its top terminus at the top side of the backing portion; and
a plurality of transducer elements disposed on the bottom side of the backing portion, each of the transducer elements in electrical communication with one of the conductive lines at its bottom terminus, the transducer elements configured to detect acoustic signals and to transmit electric signals, corresponding to the detected acoustic signals, on the conductive lines.

17. The acoustic transducer of claim 16, wherein the conductive lines converge from their bottom termini to their top termini.

18. The acoustic transducer of claim 17, wherein the backing portion is formed out of a plurality of backing layers stacked together.

19. The acoustic transducer of claim 18, wherein each of the backing layers comprises a plurality of segments of the conductive lines, each of the segments from one of the conductive lines.

20. The acoustic transducer of claim 19, further comprising a control unit in electrical communication with the top termini for receiving and processing the electric signals.

\* \* \* \* \*